J. SCHNEIBLE.
DISTILLING COLUMN.
APPLICATION FILED AUG. 2, 1919.

1,366,956.

Patented Feb. 1, 1921.

Inventor:
Joseph Schneible,

UNITED STATES PATENT OFFICE.

JOSEPH SCHNEIBLE, OF CHICAGO, ILLINOIS.

DISTILLING-COLUMN.

1,366,956.   Specification of Letters Patent.   Patented Feb. 1, 1921.

Application filed August 2, 1919. Serial No. 314,817.

*To all whom it may concern:*

Be it known that I, JOSEPH SCHNEIBLE, a citizen of the United States, residing at 130 North Wells St., Chicago, in the county of Cook and State of Illinois, have invented a new and useful Improvement in Distilling-Columns, of which the following is a specification.

My invention relates to an improvement in distilling-columns whereby the vapors rising in the column from the material undergoing distillation shall have a circular or whirling motion imparted to them in their course therethrough, and which shall permit free circulation and rapid movement of the ascending vapors and their action on the descending liquid.

By imparting such whirling motion to the rising vapors, they are more thoroughly subjected to the distilling conditions in the column, with the result of enhancing fractionation therein and the quality of the ultimate product of distillation.

Figure 1:
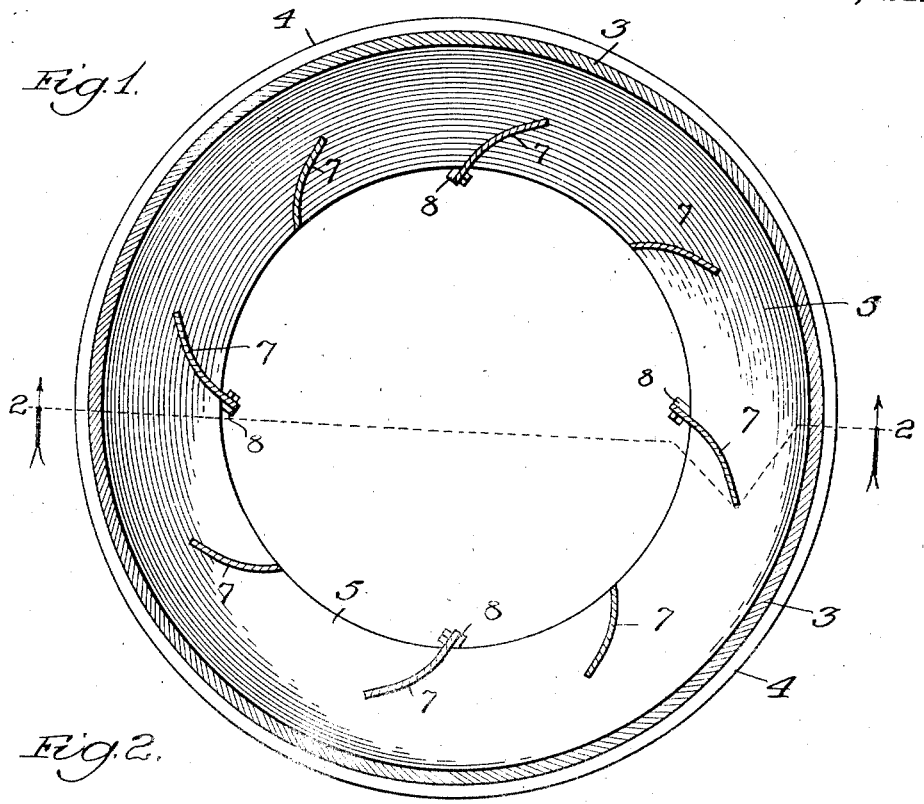
Figure 2:
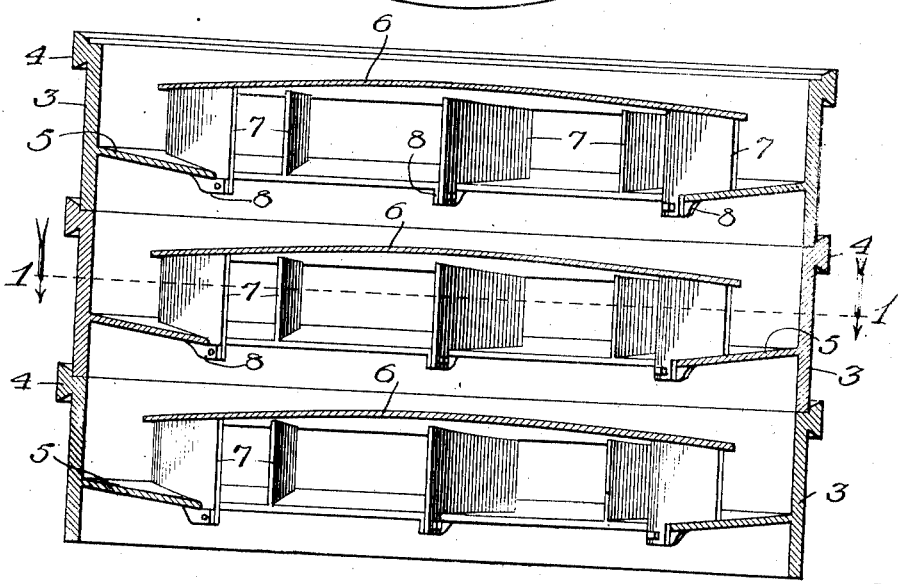

In the accompanying drawing, Figure 1 is a horizontal section, taken on line 1—1, Fig. 2, of a distilling-column embodying my improvement, and Fig. 2 is a section on line 2—2, Fig. 1, of a portion of such a distilling-column.

The column is preferably built of, or comprises a series of annular cylindrical sections 3, shown to be all alike, each having a flange 4 formed about its upper end and extending above the latter to adapt each succeeding section to seat fittingly at its lower end against the upper end of the preceding section and be bracingly encircled by the upwardly projecting portion of the annular flange. These sections may be securely tied together in their column-forming relation by any suitable means. A baffle-ring 5 extends inwardly from the wall of each section 4 and inclines downwardly toward the center thereof. A concavo-convex deflector-plate 6 has depending from it at uniform intervals, and formed integral therewith, a circular series of curved guide-vanes 7 bearing at their lower ends against and there conforming to the inclination of the baffle-ring, thus supporting on the latter the plate 6; and alternate vanes project at their lower inner corner-portions into the space within the ring 5, and are bolted to lugs 8 on the ring for reinforcing the vane-carrying deflector-plate structure, which forms an inner chamber open through circuitous courses to the outer chamber afforded by the respective chamber 3.

Vapors rising in the column-still encounter the lowermost baffle-ring 5, which directs them into the adjacent vane-chamber, wherein the vanes impart a whirling or circular motion to the rising vapors, and from which the plate 6 deflects the whirling vapors into the outer chamber of the particular column-section to be deflected by the next higher annular baffle-plate 5 and coursed in the same manner through the next-higher vane-chamber and column-section; and so on to the top of the still, where the vapors discharge as to a condenser (not shown).

I realize that considerable variation is possible in the details of construction thus specifically shown and described, and I do not intend by illustrating a single specific or preferred embodiment of my invention to be limited thereto; my intention being in the following claims to claim protection for all the novelty there may be in my invention as broadly as the state of the art will permit.

I claim:

1. A distilling column comprising a column containing a series of spaced annular baffle-plates, deflector plates, and stationary guide-vanes exposedly interposed between the deflector-plates and baffle plates and leaving unobstructed the baffle-plate openings.

2. A distilling column comprising a series of annular sections containing chambers, each comprising a lower annular baffle-plate, an upper deflector-plate and stationary guide-vanes exposedly interposed between the deflector-plate and baffle-plate and leaving unobstructed the baffle-plate opening.

3. A distilling column comprising a series of annular sections containing chambers, each chamber comprising a lower annular baffle-plate and an upper deflector-plate having a series of guide-vanes depending from it and extending to the baffle-plate.

4. A distilling column comprising a series of annular sections containing chambers, each chamber comprising a lower annular baffle-plate inclining downwardly toward the center of the section, an upper concavo-convex deflector-plate, and a series of guide-vanes between the deflector-plate and baffle-plate.

5. A distilling column comprising a series of interfitting annular sections containing chambers, each chamber comprising a lower annular baffle-plate inclining downwardly toward the center of the section and being provided with lugs at intervals, an upper concavo-convex deflector-plate, and a series of curved guide-vanes between the deflector-plate and baffle-plate, alternate vanes being fastened to said lugs.

JOSEPH SCHNEIBLE.